(12) United States Patent
Sueda et al.

(10) Patent No.: US 6,841,583 B2
(45) Date of Patent: Jan. 11, 2005

(54) COMPOSITION AND USES THEREOF

(75) Inventors: Takanori Sueda, Ichihara (JP);
Masayoshi Yamaguchi, Ichihara (JP);
Atsushi Komoriya, Tokyo (JP);
Kouichi Kizu, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 22 days.

(21) Appl. No.: 10/218,604

(22) Filed: Aug. 15, 2002

(65) Prior Publication Data

US 2003/0004219 A1 Jan. 2, 2003

Related U.S. Application Data

(63) Continuation-in-part of application No. 10/106,215, filed on Mar. 27, 2002, now abandoned.

(30) Foreign Application Priority Data

Mar. 30, 2001 (JP) ........................................ 2001-099718

(51) Int. Cl.[7] .................................................. C08J 9/00
(52) U.S. Cl. ................. 521/134; 428/305.5; 428/308.4; 428/319.9; 428/424.2; 428/424.8; 428/540; 521/144
(58) Field of Search .......................... 428/305.5, 308.4, 428/319.9, 424.2, 424.8, 540; 521/134, 144

(56) References Cited

U.S. PATENT DOCUMENTS 4,510,031 A   4/1985   Matsumura et al.

FOREIGN PATENT DOCUMENTS

| EP | 0 997 493 A1 | 5/2000 |
|----|---|---|
| EP | 1 229 076 A1 | 8/2002 |
| JP | 9-501447 A | 2/1997 |
| JP | 11-206406 A | 8/1999 |
| JP | 2000-344924 A | 12/2000 |
| WO | WO 94/25515 A1 | 11/1994 |

*Primary Examiner*—Morton Foelak
(74) *Attorney, Agent, or Firm*—Birch, Stewart, Kolasch & Birch, LLP

(57) ABSTRACT

A composition that has an ethylene/α-olefin copolymer (A), a blowing agent (B), and optionally, an organic peroxide and a crosslinking assistant. The ethylene/α-olefin copolymer (A) has an ethylene/α-olefin copolymer (A1) having a density of not less than 0.880 g/cm$^3$ and less than 0.900 g/cm$^3$ and MFR (190° C.) of 0.1 to 50 g/10 min and an ethylene/α-olefin copolymer (A2) having a density of 0.900 to 0.930 g/cm$^3$, MFR (190° C.) of 0.1 to 50 g/10 min and a main melting point peak at a position of not higher than 110° C., in a specific ratio. A foamed product, obtained by heat treatment of the composition, may be further subjected to secondary compression. A laminate made of the foamed product and a layer made of a polyolefin, a polyurethane, a rubber, a leather or an artificial leather. Footwear or a footwear part made of the foamed product or the laminate.

16 Claims, 2 Drawing Sheets

COMPOSITION AND USES THEREOF

RELATED APPLICATION

This application is a continuation-in-part application of the U.S. patent application Ser. No. 10/106,215 filed on Mar. 27, 2002 now abandoned.

FIELD OF THE INVENTION

The present invention relates to a composition and uses thereof. More particularly, the present invention relates to a composition capable of providing a foamed product (non-crosslinked or crosslinked foamed product) having an Asker C hardness of 20 to 80, low specific gravity, low compression set (CS), excellent tear strength properties, excellent impact resilience and excellent moldability, and a foamed product thereof.

BACKGROUND OF THE INVENTION

Technique of using crosslinked foamed products to obtain resins having low specific gravity, i.e., lightweight properties, softness and high mechanical strength is widely used for building interior or exterior trim materials, automobile parts such as interior trim and door glass run channels, packaging materials, daily necessities, etc. The reason is that bonding of molecular chains through crosslinking reaction of a resin makes it possible to attain lightweight properties of the resin by foaming with inhibiting lowering of mechanical strength, though only foaming of the resin to obtain lightweight properties induces lowering of mechanical strength of the resin.

Also for footwear and footwear parts such as soles (mainly midsoles) of sports shoes, crosslinked foamed products of resins are employed, and the reason is that materials which are lightweight, inhibit deformation caused by long-term use and have such mechanical strength and impact resilience that they can withstand severe use conditions are desired.

For the shoe soles, a crosslinked foamed product of an ethylene/vinyl acetate copolymer has been heretofore used and is widely known. The crosslinked foamed product obtained by the use of the ethylene/vinyl acetate copolymer has a problem that it has high specific gravity and high compression set, so that when it is used for shoe soles, the shoe soles are heavy, and if the shoe soles are used for a long period of time, they are compressed and lose mechanical strength such as impact resilience.

In National Publication of International Patent No. 501447/1997 and Japanese Patent Laid-Open Publication No. 206406/1999, an invention relating to a crosslinked foamed product using an ethylene/α-olefin copolymer and an invention relating to a crosslinked foamed product using a mixture of an ethylene/vinyl acetate copolymer and an ethylene/α-olefin copolymer are described, respectively. By the inventions, however, satisfactory performance has not been obtained though the low specific gravity and the property of the compression set have been improved.

In Japanese Patent Laid-Open Publication No. 344924/2000 filed by the present inventors, an olefin elastomer crosslinked foamed product, which has high expansion ratio, is free from surface roughening due to defoaming and has soft touch, low compression set, excellent tear strength properties and excellent heat resistance, and an elastomer composition for the crosslinked foamed product are disclosed. That is to say, this crosslinked foamed product is obtained by heat-treating an olefin elastomer composition comprising an ethylene/α-olefin copolymer (A) having a density of 0.88 to 0.92 g/cm$^3$ and a melt flow rate (190° C.) of 0.1 to 10 g/10 min, an organic peroxide (B), a crosslinking assistant (C) and a blowing agent (D) The ethylene/α-olefin copolymer (A) comprises 5 to 95 parts by weight of an ethylene/α-olefin copolymer (A1') having a density of not less than 0.88 g/cm$^3$ and less than 0.90 g/cm$^3$ and a melt flow rate (190° C.) of 0.1 to 50 g/10 min and 5 to 95 parts by weight of an ethylene/α-olefin copolymer (A2') having a density of 0.90 to 0.93 g/cm$^3$ and a melt flow rate (190° C.) of 0.1 to 50 g/10 min, the total of said components (A1') and (A2') being 100 parts by weight, and the mixture of the ethylene/α-olefin copolymers (A1') and (A2') has a melt flow rate (190° C.) of 0.5 to 10 g/10 min. In this invention, the ethylene/α-olefin copolymer (A2') having a relatively high density is incorporated in order to secure a hardness necessary for the resulting crosslinked foamed product, for example, a hardness necessary for footwear. The hardness necessary for footwear cannot be secured by only incorporation of the ethylene/α-olefin copolymer (A1') of a relatively low density alone, and the resulting crosslinked foamed product is unsatisfactory for footwear.

The ethylene/α-olefin copolymer (A2'), however, has a problem. That is, in order to increase a surface hardness of the resulting crosslinked foamed product, the copolymer (A2') is liable to have a higher melting point as compared with the ethylene/α-olefin copolymer (A1'), and hence kneading operation becomes difficult. More specifically, the copolymer (A2') has a problem that in the kneading process, a high energy is necessary or mixing is not made well, and in an extreme case, a kneading device is broken. In case of a usual composition containing a high-melting point component, the above-mentioned kneading problem is solved by elevating the kneading temperature. In case of a foamable composition, however, the kneading operation needs to be carried out at a temperature lower than the prescribed temperature (usually not higher than 100° C.) because the elevated kneading temperature decomposes the blowing agent and/or the crosslinking agent.

The present inventors have earnestly studied to solve the kneading problem mentioned above, and as a result, have found that the kneading can be facilitated and a crosslinked foamed product having a hardness enough for a footwear foamed product can be obtained by adopting an ethylene/α-olefin copolymer (A2) having a density of 0.900 to 0.930 g/cm$^3$, a melt flow rate (ASTM D 1238, 190° C., load of 2.16 kg) of 0.1 to 50 g/10 min and a main melting point peak at a position of not higher than 110° C., instead of the above-mentioned ethylene/α-olefin copolymer (A2') and that an excellent interlaminar adhesive strength of the laminate comprising a layer of the foamed product and a layer of at least one material selected from the group consisting of a polyolefin, a polyurethane, a rubber, a leather and an artificial leather can be obtained especially when both the above-mentioned ethylene/α-olefin copolymers (A1) and (A2) contained in the composition of the foamed product are ethylene/1-butene copolymers. Based on the finding, the present invention has been accomplished.

OBJECT OF THE INVENTION

The present invention is intended to solve such a problem associated with the prior art as described above, and it is an object of the invention to provide a composition capable of providing a foamed product (non-crosslinked or crosslinked foamed product) having an Asker C hardness of 20 to 80, low specific gravity, low compression set (CS), excellent tear strength properties, excellent impact resilience and excellent moldability, a foamed product thereof and a laminate having an excellent interlaminar adhesive strength using the foamed product.

It is another object of the invention to provide footwear parts comprising the foamed product or the laminate, such as shoe soles, midsoles of shoes, innersoles of shoes, and sandals.

SUMMARY OF THE INVENTION

The composition according to the invention is a composition comprising an ethylene/α-olefin copolymer (A) and a blowing agent (B), wherein the ethylene/α-olefin copolymer (A) comprises:

5 to 95 parts by weight of an ethylene/α-olefin copolymer (A1) having a density of not less than 0.880 g/cm$^3$ and less than 0.900 g/cm$^3$ and a melt flow rate (ASTM D 1238, 190° C., load of 2.16 kg) of 0.1 to 50 g/10 min, and 5 to 95 parts by weight of an ethylene/α-olefin copolymer (A2) having a density of 0.900 to 0.930 g/cm$^3$, a melt flow rate (ASTM D 1238, 190° C., load of 2.16 kg) of 0.1 to 50 g/10 min and a main melting point peak at a position of not higher than 110° C., the total of said components (A1) and (A2) being 100 parts by weight.

A foamed product obtained from this composition has a hardness enough for a foamed product for footwear.

In the present invention, especially both the ethylene/α-olefin copolymers (A1) and (A2) preferably are ethylene/1-butene copolymers.

And also, in the present invention, at least one of the ethylene/α-olefin copolymers (A1) and (A2) preferably has the following properties:

the ratio ($MFR_{10}/MFR_{2.16}$) of the melt flow rate ($MFR_{10}$) as measured under the conditions of a temperature of 190° C. and a load of 10 kg in accordance with ASTM D 1238, to the melt flow rate ($MFR_{2.16}$), as measured under the conditions of a temperature of 190° C. and a load of 2.16 kg in accordance with ASTM D 1238, satisfies the following relation:

$$MFR_{10}/MFR_{2.16} \geq 5.63,$$

and the molecular weight distribution (Mw/Mn) and the above-mentioned melt flow rate ratio satisfy the following relation:

$$Mw/Mn \leq (MFR_{10}/MFR_{2.16}) - 4.63.$$

Moreover, at least one of the ethylene/α-olefin copolymers (A1) and (A2) more preferably has the following properties:

the ratio ($MFR_{10}/MFR_{2.16}$) of the melt flow rate ($MFR_{10}$), as measured under the conditions of a temperature of 190° C. and a load of 10 kg in accordance with ASTM D 1238, to the melt flow rate ($MFR_{2.16}$), as measured under the conditions of a temperature of 190° C. and a load of 2.16 kg in accordance with ASTM D 1238, satisfies the following relation:

$$MFR_{10}/MFR_{2.16} \geq 5.63,$$

and the molecular weight distribution (Mw/Mn), the melt flow rate and the above-mentioned melt flow rate ratio satisfy the following relation:

$$Mw/Mn + 4.63 \leq MFR_{10}/MFR_{2.16} \leq 14 - 2.9 Log(MER_{2.16})$$

The ethylene/α-olefin copolymer (A) preferably has a density of 0.880 to 0.920 g/cm$^3$ and a melt flow rate (ASTM D 1238, 190° C., load of 2.16 kg) of 0.1 to 10 g/10 min.

In the composition of the invention, the blowing agent (B) is usually selected from an organic thermal decomposition type blowing agent, an inorganic thermal decomposition type blowing agent, an organic physical blowing agent and an inorganic physical blowing agent.

The foamed product according to the invention is obtained by heat treatment of the above-mentioned composition of the invention.

The foamed product of the invention may be a foamed product obtained by subjecting the above-mentioned foamed product to secondary compression.

The laminate according to the invention has a layer comprising the foamed product of the invention and a layer comprising at least one material selected from the group consisting of a polyolefin, a polyurethane, a rubber, a leather and an artificial leather.

A process for producing the laminate according the invention comprises a step of foaming the composition of the invention and a step of laminating the foamed product obtained by the former step with at least one material selected from the group consisting of a polyolefin, a polyurethane, a rubber, a leather and an artificial leather.

The footwear and the footwear part according to the invention comprise the foamed product of the invention or the laminate of the invention.

The footwear part is, for example, a midsole, an innersole or a sole.

DETAILED DESCRIPTION OF THE INVENTION

Figure 1:
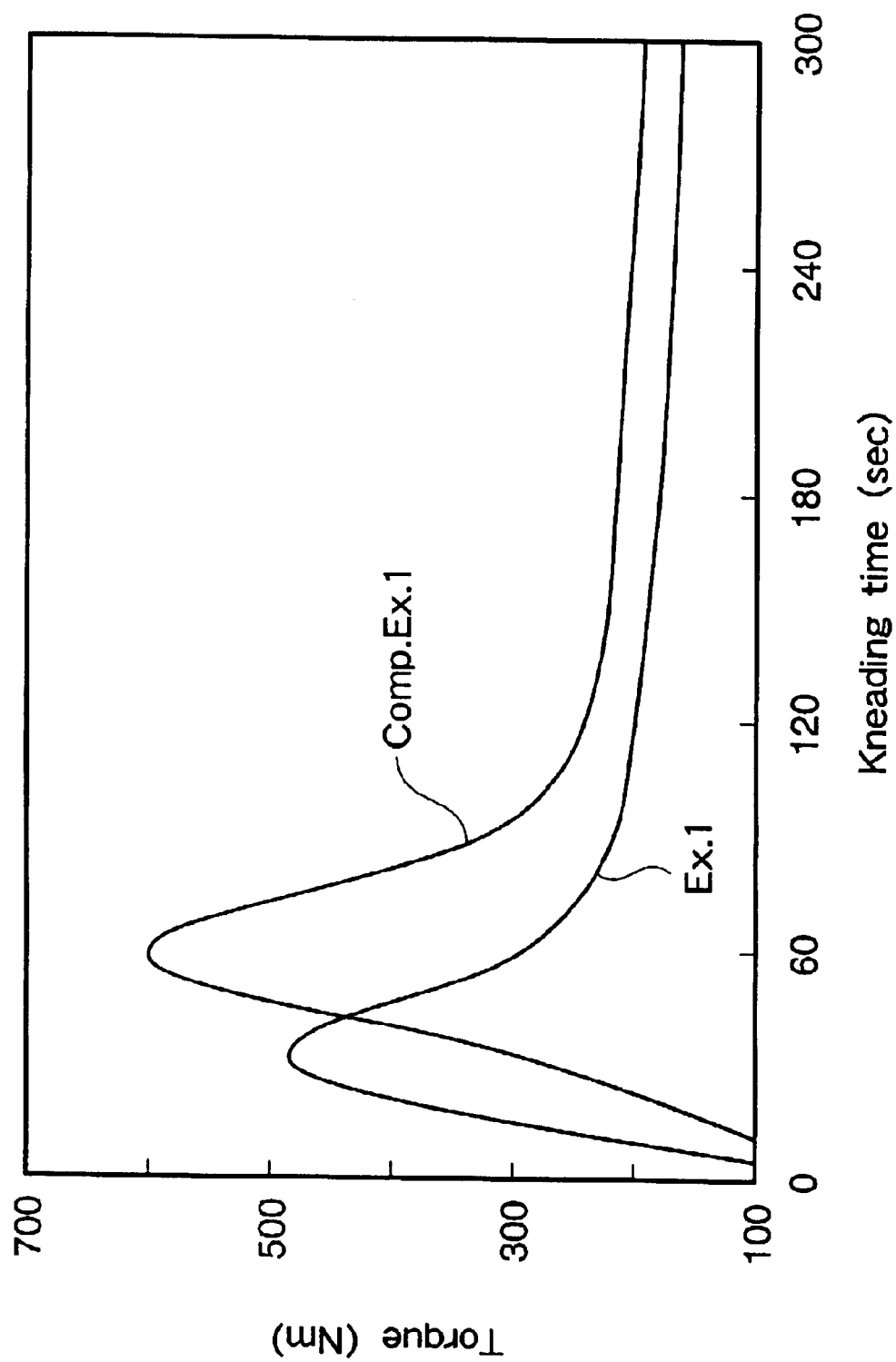
FIG. 1 is a graph showing change of torque of each composition of Example 1 and Comparative Example 1 with kneading time.

The composition according to the invention and uses thereof are described in detail hereinafter.

The composition according to the invention comprises a specific ethylene/α-olefin copolymer (A), a blowing agent (B), and optionally, an organic peroxide (C) and a crosslinking assistant (D).

The foamed product according to the invention is obtained by subjecting the composition to foaming or crosslink foaming. Examples of the crosslinking methods include thermal crosslinking and ionizing radiation crosslinking. In case of the thermal crosslinking, it is necessary to add the organic peroxide (C) and the crosslinking assistant (D) in the composition. And in case of the ionizing radiation crosslinking, the crosslinking assistant (D) may be added.

Ethylene/α-olefin Copolymer (A)

The ethylene/α-olefin copolymer (A) for use in the invention comprises the following ethylene/α-olefin copolymers (A1) and (A2).

The ethylene/α-olefin copolymer (A1) is a non-crystalline or low-crystalline random or block copolymer of ethylene and an α-olefin of 3 to 20 carbon atoms, and is desirably a soft ethylene/α-olefin copolymer having a density (ASTM D 1505) of not less than 0.880 g/cm$^3$ and less than 0.900 g/cm$^3$ and a melt flow rate (MFR, ASTM D 1238, 190° C., load of 2.16 kg) of 0.1 to 50 g/10 min, preferably 0.5 to 20 g/10 min.

The α-olefin to be copolymerized with ethylene is an α-olefin of 3 to 20 carbon atoms, and examples thereof include propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene and 4-methyl-1-pentene. Of these, preferable are α-olefins of 3 to 10 carbon atoms, and particularly preferable are propylene, 1-butene, 1-hexene and 1-octene. These α-olefins are used singly or in combination of two or more kinds.

The ethylene/α-olefin copolymer (A1) desirably contains units derived from ethylene in amounts of 85 to 95% by mol and units derived from an α-olefin of 3 to 20 carbon atoms in amounts of 5 to 15% by mol.

Composition of the ethylene/α-olefin copolymer (A1) or the ethylene/α-olefin copolymer (A2) as described later is usually determined by measuring a $^{13}C$-NMR spectrum of a sample obtained by homogeneously dissolving about 200 mg of the ethylene/α-olefin copolymer in 1 ml of hexachlorobutadiene in a sample tube of 10 mm diameter, under the conditions of a measuring temperature of 120° C., a measuring frequency of 25.05 MHz, a spectral width of 1500 Hz, a pulse repetition time of 4.2 sec and a pulse width of 6 $\mu$sec.

The ethylene/α-olefin copolymer (A1) may further contain units derived from other polymerizable monomers in addition to the above units, within limits not detrimental to the objects of the present invention.

Examples of the ethylene/α-olefin copolymers (A1) include an ethylene/propylene copolymer, an ethylene/1-butene copolymer, an ethylene/propylene/1-butene copolymer, an ethylene/propylene/ethylidene norbornene copolymer, an ethylene/1-hexene copolymer and an ethylene/1-octene copolymer. Of these, an ethylene/propylene copolymer, an ethylene/1-butene copolymer, an ethylene/1-hexene copolymer and an ethylene/1-octene copolymer are preferably used, and particularly preferably an ethylene/1-butene copolymer is used. These copolymers may be a random or a block copolymer, however it is particularly desirable to be a random copolymer.

The ethylene/α-olefin copolymer (A1) has a crystallinity, as measured by X-ray diffractometry, of usually not more than 40%, preferably 10 to 30%.

The ethylene/α-olefin copolymer (A1) can be prepared by a hitherto known process using a vanadium catalyst, a titanium catalyst, a metallocene catalyst or the like.

The ethylene/α-olefin copolymer (A2) is usually a low-crystalline random or block copolymer of ethylene and an α-olefin of 3 to 20 carbon atoms, and is desirably a soft ethylene/α-olefin copolymer having a density (ASTM D 1505) of 0.900 to 0.930 g/cm$^3$, preferably 0.900 to 0.920 g/cm$^3$, a melt flow rate (MFR, ASTM D 1238, 190° C., load of 2.16 kg) of 0.1 to 50 g/10 min, preferably 0.5 to 20 g/10 min, and a main melting point peak at a position of not higher than 110° C.

The α-olefin to be copolymerized with ethylene is an α-olefin of 3 to 20 carbon atoms, and examples thereof include propylene, 1-butene, 1-pentene, 1-hexene, 1-heptene, 1-octene, 1-nonene, 1-decene, 1-undecene, 1dodecene, 1-hexadecene, 1-octadecene, 1-nonadecene, 1-eicosene and 4-methyl-1-pentene. Of these, preferable are α-olefins of 3 to 10 carbon atoms, and of these, propylene, 1-butene, 1-hexene and 1-octene are preferable. Particularly preferable is 1-butene. These α-olefins are used singly or in combination of two or more kinds.

The ethylene/α-olefin copolymer (A2) desirably contains units derived from ethylene in amounts of 90 to 99% by mol and units derived from an α-olefin of 3 to 20 carbon atoms in amounts of 1 to 10% by mol.

The ethylene/α-olefin copolymer (A2) may further contain units derived from other polymerizable monomers in addition to the above units, within limits not detrimental to the objects of the present invention.

Examples of the ethylene/α-olefin copolymers (A2) include an ethylene/propylene copolymer, an ethylene/1-butene copolymer, an ethylene/propylene/1-butene copolymer, an ethylene/propylene/ethylidene norbornene copolymer, an ethylene/1-hexene copolymer and an ethylene/1-octene copolymer. Of these, an ethylene/propylene copolymer, an ethylene/1-butene copolymer, an ethylene/1-hexene copolymer and an ethylene/1-octene copolymer are preferably used, and particularly preferably an ethylene/1-butene copolymer is used. These copolymers may be a random or a block copolymer, however it is particularly desirable to be a random copolymer.

The "main melting point peak" is a maximum peak among endothermic peaks shown in an endothermic curve of the copolymer, said endothermic curve being obtained by using a differential scanning calorimeter (DSC) when a sample placed in an aluminum pan is heated up to 200° C. at a rate of 50° C./min, then held at 200° C. for 5 minutes, cooled to −40° C. at a rate of 10° C./min and then heated up to 150° C. at a rate of 10° C./min. When plural endothermic peaks are present, absolute values on the ordinate axis represented by a unit W (energy/time), not but areas of the peaks, are compared, and the peak of the maximum value is taken as a main melting point peak.

The surface hardness of the ethylene/α-olefin copolymer (A2) is preferably in the range of 30 to 70 in terms of a Shore D hardness (ASTM D 2240). When the ethylene/α-olefin copolymer (A2) having such a Shore D hardness is used, a crosslinked foamed product having a hardness preferable for footwear can be obtained.

The ethylene/α-olefin copolymer (A2) has a crystallinity, as measured by X-ray diffractometry, of usually not more than 50%, preferably 15 to 40%.

The ethylene/α-olefin copolymer (A2) can be prepared by a hitherto known process using a Ziegler catalyst, a metallocene catalyst or the like.

The ethylene/α-olefin copolymer (A2) is desirably an ethylene/α-olefin copolymer obtained by solution polymerization. According to the solution polymerization, an ethylene/α-olefin copolymer (A2) having a preferred melting point can be easily obtained. On the other hand, an ethylene/α-olefin copolymer prepared by gas phase polymerization tends to have plural melting point peaks, and hence a part of the melting point peaks are liable to occur in the temperature region of not lower than 110° C.

At least one of the ethylene/α-olefin copolymers (A1) and (A2) desirably has the following properties:

the ratio ($MFR_{10}/MFR_{2.16}$) of the melt flow rate ($MFR_{10}$), as measured under the conditions of a temperature of 190° C. and a load of 10 kg in accordance with ASTM D 1238, to the melt flow rate ($MFR_{2.16}$), as measured under the conditions of a temperature of 190° C. and a load of 2.16 kg in accordance with ASTM D 1238, satisfies the following relation:

$$MFR_{10}/MFR_{2.16} \geq 5.63,$$

and the molecular weight distribution (Mw/Mn) and the above-mentioned melt flow rate ratio satisfy the following relation:

$$Mw/Mn \leq (MFR_{10}/MFR_{2.16})-4.63,$$

preferably $$Mw/Mn+4.63 \leq MFR_{10}/MFR_{2.16} \leq 14-2.9 Log(MFR_{2.16}).$$

If the above relations are satisfied, a composition capable of producing a foamed product (non-crosslinked foamed product, crosslinked foamed product) having high expansion ratio, i.e., low specific gravity, high elastomeric properties, excellent compression set resistance and excellent moldability can be obtained.

The molecular weight distribution (Mw/Mn) was measured in the following manner using Millipore GPC-150C. A separatory column of TSK GNH HT having a diameter of 72 mm and a length of 600 mm was used, and the column temperature was set at 140° C. A sample (concentration: 0.1% by weight, pour: 500 microliter) was moved at a rate of 1.0 ml/min using o-dichlorobenzene (available from Wako Junyaku Kogyo K.K.) as a mobile phase and 0.025% by weight of BHT (available from Takeda Chemical Industries, Ltd.) as an antioxidant. As a detector, a differential refractometer was used. As standard polystyrenes, those of Mw<1000 and Mw>$4\times10^6$ available from Tosoh K.K. and those of $1000 \leq Mw \leq 4\times10^6$ available from Pressure Chemical Co. were used.

The ethylene/α-olefin copolymer (A1) is used in an amount of 5 to 95 parts by weight, preferably 50 to 90 parts by weight, and the ethylene/α-olefin copolymer (A2) is used in an amount of 5 to 95 parts by weight, preferably 10 to 50 parts by weight, with the proviso that the total of the components (A1) and (A2) is 100 parts by weight.

The ethylene/α-olefin copolymer (A) for use in the invention, namely, a mixture of the ethylene/α-olefin copolymer (A1) and the ethylene/α-olefin copolymer (A2), is desirably a soft ethylene/α-olefin copolymer having a density (ASTM D 1505) of 0.880 to 0.920 g/cm$^3$ and a melt flow rate (MFR, ASTM D 1238, 190° C., load of 2.16 kg) of 0.1 to 10 g/10 min, preferably 0.5 to 10 g/10 min.

The-ethylene/α-olefin copolymer (A) preferably has a molecular weight distribution (Mw/Mn), as measured by gel permeation chromatography (GPC), of 2.3 to 4.0. When the ethylene/α-olefin copolymer (A) having a molecular weight distribution in the above range is used, a composition capable of producing a foamed product having excellent compression set resistance and moldability is obtained.

The ethylene/α-olefin copolymer (A) usually exhibits properties of an elastomer.

Blowing Agent (B)

The blowing agent (B) for use in the invention is, for example, a chemical blowing agent. Examples of the chemical blowing agents include an organic thermal decomposition type blowing agent and an inorganic thermal decomposition type blowing agent. Specific examples of the organic thermal decomposition type blowing agents include azo compounds, such as azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis(2,4,4-trimethylpentane), 1,1'-azobis(cyclohexane-1-carbonitrile) and 2,2'-azobis[N-(2-carboxyethyl)-2-methylpropionamidine]; nitroso compounds, such as N,N'-dinitrosopentamethylenetetramine (DPT); hydrazine derivatives, such as 4,4'-oxybis(benzenesulfonylhydrazide) and diphenylsulfone-3,3'-disulfonylhydrazide; semicarbazide compounds, such as p-toluenesulfonylsemicarbazide; and trihydrazinotriazine. Specific examples of the inorganic thermal decomposition type blowing agents include bicarbonates, such as sodium hydrogencarbonate and ammonium hydrogencarbonate; carbonates, such as sodium carbonate and ammonium carbonate; nitrites, such as ammonium nitrite; and hydrogen compounds. Of these, azodicarbonamide (ADCA) and sodium hydrogencarbonate are particularly preferable.

In the present invention, a physical blowing agent (blowing agent which is not always accompanied by chemical reaction in the foaming process) such as an organic physical blowing agent or an inorganic physical blowing agent is also employable as the blowing agent (B). Examples of the organic physical blowing agents include methanol; ethanol; various aliphatic hydrocarbons, such as propane, butane, pentane and hexane; various chlorohydrocarbons, such as dichloroethane, dichloromethane and carbon tetrachloride; and various fluorochlorohydrocarbons, such as Freon. Examples of the inorganic physical blowing agents include air, carbon dioxide, nitrogen, argon and water. Of these, carbon dioxide, nitrogen and argon are the most preferable from the viewpoint of the need of vaporization, cost, environmental pollution and the probability of the ignition.

As the physical blowing agent used as a blowing agent (B) in the present invention is decomposed completely without the residue, it prevents stains of the mold at the crosslinking foaming process of the composition. Moreover, as the physical blowing agent is not powdery, it is superior to the kneadability. And when this physical blowing agent is used, the smell (an ammonia smell at ADCA decomposition etc.) of the obtained crosslinked foamed product can be prevented.

In the present invention, the above-mentioned chemical blowing agent can be used together with the physical blowing agent within limits not detrimental to the occurrences of the smell and the mold strain etc.

Regarding the storage of the physical blowing agent, when it is used in the small production rate, a gas such as carbon dioxide or nitrogen in bomb can be supplied through a regulator to an injection molding machine or an extrusion molding machine. And there is a case to be supplied to an injection molding machine or an extrusion molding machine after pressurizing it by a pump or the like.

In the facility of large production rate of the crosslinked foamed product, the physical blowing agent can be supplied from a liquid carbon dioxide or liquid nitrogen storage tank after vaporization through a vaporizer and depressurizing by a pressure-reducing valve to an injection molding machine or an extrusion molding machine by a pipe line.

When the physical blowing agent is in the liquid state, it is preferable to be a storage pressure in the range of 0.13 to 100 MPa. If the storage pressure is too low, it cannot be supplied through a pressure-reducing valve to an injection molding machine or an extrusion molding machine. And if the storage pressure is too high, it is not preferable because the design pressure of the storage facilities has to be raised and they become oversized or complicated. The definition of the storage pressure in the invention is a pressure before supplying a pressure-reducing valve after vaporization.

When a chemical blowing agent is used as the blowing agent (B), the chemical blowing agent is used in an amount of usually 3 to 20 parts by weight, preferably 5 to 15 parts by weight, based on 100 parts by weight of the ethylene/α-olefin copolymer (A). However, the amount of the chemical blowing agent can be increased or decreased appropriately to be the desired expansion ratio, because the gas evolved is different depending upon the kind or the grade of the chemical blowing agent used.

When a physical blowing agent is used as the blowing agent (B), the amount of the physical blowing agent is properly determined according to the desired expansion ratio.

In the present invention, a blowing assistant may be used, if necessary, together with the blowing agent (B). The blowing assistant functions to lower decomposition temperature of the blowing agent (B), to accelerate the decomposition and to produce uniform bubbles.

Examples of the blowing assistants include zinc oxide (ZnO), zinc stearate, organic acids such as salicylic acid, phthalic acid, stearic acid and oxalic acid, and urea or its derivatives.

Organic Peroxide (C)

Examples of the organic peroxides (C) optionally used in the invention include dicumyl peroxide, di-t-butyl peroxide, 2,5-dimethyl-2,5-di-(t-butylperoxy)hexane, 2,5-dimethyl-2, 5-di-(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy) valerate, benzoyl peroxide, p-chlorobenzoyl peroxide, 2,4-dichlorobenzoyl peroxide, t-butyl peroxybenzoate, t-butyl perbenzoate, t-butylperoxyisopropyl carbonate, diacetyl peroxide, lauroyl peroxide and t-butylcumyl peroxide.

In the present invention, the organic peroxide (C) is used in an amount of usually 0.1 to 1.5 parts by weight, preferably 0.2 to 1.0 part by weight, based on 100 parts by weight of the ethylene/α-olefin copolymer (A) (mixture of the component (A1) and the component (A2)). When the organic peroxide (C) is used in the above amount, a crosslinked foamed product having a moderately crosslinked structure can be obtained. When the organic peroxide (C) is used in the above amount together with the crosslinking assistant (D), a crosslinked foamed product having a more moderately crosslinked structure can be obtained.

Crosslinking Assistant (D)

Preferred examples of the crosslinking assistants (D) optionally used in the invention include peroxy crosslinking assistants, such as sulfur, p-quinonedioxime, p,p'-dibenzoyl quinonedioxime, N-methyl-N-4-dinitrosoaniline, nitrosobenzene, diphenylguanidine and trimethylolpropane-N,N'-m-phenylenedimaleimide; divinylbenzene, triallyl cyanurate (TAC), and triallyl isocyanurate (TAIC). Also available are polyfunctional methacrylate monomers, such as ethylene glycol dimethacrylate, diethylene glycol dimethacrylate, polyethylene glycol dimethacrylate, trimethylolpropane trimethacrylate and allyl methacrylate; and polyfunctional vinyl monomers, such as vinyl buryrate and vinyl stearate. Of these, preferable are triallyl cyanurate (TAC) and triallyl isocyanurate (TAIC).

In the present invention, the crosslinking assistant (D) is used in such an amount that the weight ratio ((D)/(C)) of the crosslinking assistant (D) to the organic peroxide (C) becomes 1/30 to 5/1, preferably 1/20 to 3/1, more preferably 1/15 to 2/1.

Preparation of Composition

The composition according to the invention is an uncrosslinked and unfoamed composition, and may be in a molten state or may be in the form of cooled and hardened pellets or sheet.

The pellets of the composition of the invention can be prepared by, for example, a process comprising blending the ethylene/α-olefin copolymer (A) (mixture of the component (A1) and (A2)), the blowing agent (B), and optionally, the organic peroxide (C), the crosslinking assistant (D) and the blowing assistant in the aforesaid ratio by a Henschel mixer or the like, melt plastifying the blend by a kneading machine such as a Banbury mixer, a roll or an extruder at a temperature at which the blowing agent (B) and/or the organic peroxide (C) is not decomposed, then homogeneously mixing and dispersing the mixture, and pelletizing.

In addition to the above components, various additives, such as filler, heat stabilizer, weathering stabilizer, flame retardant, hydrochloric acid absorbent and pigment, can be added to the composition if necessary, within limits not detrimental to the objects of the present invention.

The sheet of the composition of the invention can be prepared from, for example, the pellets of the composition obtained as above using an extruder or a calendering machine. The uncrosslinked and unfoamed, foamable sheet can be prepared by kneading the components for the composition by a Brabender mill or the like and then molding the kneadate into a sheet by a calender roll or a press molding machine, or by kneading the components by an extruder and then passing the kneadate through a T-die or a circular die.

Foamed Product

The foamed product according to the invention is obtained by subjecting the composition of the invention to foaming or crosslink foaming under the conditions of usually a temperature of 130 to 200° C., a pressure of 30 to 300 kgf/cm$^2$ and a period of 10 to 90 minutes. However, the (crosslink) foaming time depends upon the thickness of the mold, and hence the time of the above range may be appropriately increased or decreased.

The foamed product of the invention may be a foamed product obtained by subjecting a molded product, which has been foamed or crosslink foamed under the above conditions, to compression molding under the conditions of a temperature of 130 to 200° C., a pressure of 30 to 300 kgf/cm$^2$, a period of 5 to 60 minutes and a compression ratio of 1.1 to 3, preferably 1.3 to 2.

The foamed product has a specific gravity (JIS K 7222) of 0.05 to 0.25 and a surface hardness (Asker C hardness) of 20 to 80. The crosslinked foamed product desirably has a gel fraction of not less than 70% and usually has a gel fraction of 70 to 90%.

The foamed product of the invention having the above properties, particularly a crosslinked foamed product, has low compression set, high tear strength and high impact resilience.

The gel fraction (gel content, xylene-insoluble content) is measured in the following manner.

A sample of the crosslinked foamed product is weighed and cut into fine pieces. Then, the fine pieces are placed in a closed container together with xylene, and they are refluxed for 3 hours.

Then, the sample is taken out on a filter paper and dried absolutely. From the weight of the dry residue, the weight of the xylene-insoluble components other than the polymer component (e.g., filler, filling material, pigment) is subtracted, and the obtained value is taken as a "corrected final weight (Y)".

On the other hand, from the weight of the sample, the weight of the xylene-soluble components other than the polymer component (e.g., stabilizer) and the weight of the xylene-insoluble components other than the polymer component (e.g., filler, filling material, pigment) are subtracted, and the obtained value is taken as a "corrected initial weight (X)".

The gel content (xylene-insoluble content) is calculated from the following formula:

Gel content (% by weight)=(Corrected final weight (Y))÷(Corrected initial weight (X))×100

Production of Foamed Product

The foamed product (non-crosslinked or crosslinked foamed product) according to the invention can be produced by, for example, the following process.

A sheet of the composition of the invention can be obtained by, for example, molding the mixture previously described in the preparation of the composition using a calendering machine, a press molding machine or a T-die extruder. The sheet molding needs to be carried out at a temperature of not higher than the decomposition temperatures of the blowing agent (B) and the organic peroxide (C)

More specifically, the sheet molding needs to be carried out under such conditions that the temperature of the molten composition becomes 100 to 130° C.

The composition in the form of a sheet obtained above is cut into a volume of 1.0 to 1.2 times the volume of a mold, then placed in the mold maintained at 130 to 200° C. and held in the mold at a clamping force of 30 to 300 kgf/cm$^2$ and a holding time of 10 to 90 minutes to produce a primary foamed product (non-crosslinked or crosslinked foamed product). However, the (crosslinking) time depends upon the thickness of the mold, and hence the time of the above range may be appropriately increased or decreased.

The shape of the mold for (crosslink) foaming is not specifically restricted, but usually, a mold having a shape by which a sheet is obtainable is employed. The mold needs to have a completely closed structure so that the molten resin and a gas generated during the decomposition of the blowing agent do not escape. The frame is preferably an inside-tapered frame from the viewpoint of releasability of the resin.

The primary foamed product obtained above is imparted with a given shape by compression molding. The compression molding is carried out under the conditions of a mold temperature of 130 to 200° C., a clamping force of 30 to 300 kgf/cm$^2$, a compression time of 5 to 60 minutes and a compression ratio of 1.1 to 3.0.

In order that the crosslinked foamed product is obtained by crosslinking due to irradiation with ionizing radiation, first, the ethylene/α-olefin copolymer (A), an organic thermal decomposition type blowing agent as the blowing agent (B) and other additives are melt kneaded at a temperature of lower than the decomposition temperature of the organic thermal decomposition type blowing agent, and the resulting kneadate is molded into a sheet to obtain a foamable sheet.

Then, the foamable sheet thus obtained is irradiated with an ionizing radiation in a given dose to crosslink the ethylene/α-olefin copolymer (A), and then the resulting foamable crosslinked sheet is heated to a temperature of not lower than the decomposition temperature of the organic thermal decomposition type blowing agent to foam the sheet, whereby a crosslinked foamed sheet can be obtained.

Examples of the ionizing radiations employable herein include α ray, β ray, γ ray, electron ray, neutron ray and X ray. Of these, γ ray of cobalt-60 and electron ray are preferably employed.

Examples of shapes of the foamed products include sheet, thick board, net and shaped articles.

From the crosslinked foamed product obtained as above, a secondary crosslinked foamed product having the aforesaid properties can be produced in a manner similar to that of the preparation of the primary foamed product.

Laminate

The laminate according to the invention is a laminate having a layer comprising the foamed product (non-crosslinked or crosslinked foamed product) of the invention and a layer comprising at least one material selected from the group consisting of a polyolefin, a polyurethane, a rubber, a leather and an artificial leather.

There is no specific limitation on the polyolefin, polyurethane, rubber, leather and artificial leather, and any of hitherto known polyolefins, polyurethanes, rubbers, leathers and artificial leathers is employable.

The laminate of the invention is favorably used for footwear and footwear parts.

Footwear and Footwear Part

The footwear and the footwear part according to the invention comprise the foamed product (non-crosslinked or crosslinked foamed product) of the invention or the laminate of the invention.

Examples of the footwear parts include shoe soles, midsoles, innersoles and soles of shoes, and sandals.

EFFECT OF THE INVENTION

According to the invention, there can be provided a composition capable of providing a foamed product (non-crosslinked or crosslinked foamed product) having an Asker C hardness of 20 to 80, low specific gravity, low compression set (CS), excellent tear strength properties, excellent impact resilience and excellent moldability, a foamed product (including secondary compression foamed product) of the composition and a laminate using the foamed product. Especially, when ethylene/1-butene copolymers are used as the ethylene/α-olefin copolymers (A1) and (A2) contained in the composition of the foamed product, the laminate having more excellent interlaminar adhesive strength can be obtained.

According to the invention, further, footwear and footwear parts comprising the above non-crosslinked or crosslinked foamed product or the above laminate can be provided.

EXAMPLE

The present invention is further described with reference to the following examples, but it should be construed that the invention is in no way limited to those examples.

The foamed products obtained in the examples and the comparative examples were measured or evaluated on the specific gravity, Asker C hardness, tensile strength, tear strength, compression set, impact resilience and moldability in accordance with the following methods. And the feel of softness was evaluated by the following method. Moreover, the adhesive strength of the laminate comprising a foamed product obtained and a polyurethane artificial leather sheet was measured by the method described below.

(1) Specific Gravity of Foamed Product

The specific gravity of a foamed product having the formed skin (abbreviated to skin $_{on}$) was measured in accordance with JIS K 7222, whereas the specific gravity of a foamed product not having the formed skin (abbreviated to skin $_{off}$) was measured with the use of an electronic gravimeter manufactured by Mirage Trading Co., Ltd (Model MD-200S).

(2) Asker C Hardness

The Asker C hardness was determined in accordance with "Spring hardness test C test method" described in the annexed document of JIS K 7312-1996 Annex 2.

(3) Tensile Strength

A tensile test was carried out under the conditions of a measuring temperature of 23° C. and a stress rate of 500 mm/min in accordance with JIS K 6301, to measure a tensile strength at break of the crosslinked foamed sheet.

(4) Tear Strength

A tear strength test was carried out under the conditions of a stress rate of 100 mm/min in accordance with BS5131-2.6, to determine a tear strength.

(5) Compression Set

A compression set test was carried out under the conditions of 5° C.×6 hr and a compression of 50% to compress a foamed product and measure the thickness after 30 minute release in accordance with JIS K 6301, to determine a compression set.

(6) Feel of Softness

By touching the surface of a foamed product, the feel of softness was evaluated to be the following five grades.
[Evaluation of Five Grades]
 5: The surface was felt flat and soft.
 4: The surface was felt a little gritty but soft.
 3: Evaluation between 2 and 4.
 2: The surface was felt gritty and a little hard.
 1: The surface was felt rough and hard like a resin.

(7) Impact Resilience

The impact resilience was measured in accordance with JIS K 6255.

(8) Adhesive Strength of a Laminate

[Treatment of a Secondary Crosslinked Foamed Product]

A surface of a secondary crosslinked foamed product was washed with water containing surface active agent, and dried at a room temperature for 1 hour.

Then the secondary crosslinked foamed product was dipped in methylcyclohexane for 3 minutes, and dried in an oven of 60° C. for 3 minutes.

Successively, an ultraviolet cure type primer (trade name: GE258H1 available from Daito Jyushi K.K.) was coated with a brush thinly, and dried in an oven of 60° C. for 3 minutes. Then ultraviolet light with the use of 3 high pressure mercury lamps of each 80 W/cm (UV Irradiation Device, manufactured by Japan Storage Battery Co., Ltd., EPSH-600-3S type) was irradiated moving it at a conveyor speed of 10 m/min at 15 cm distance from the light mounting perpendicular to passing direction.

Thereafter, an auxiliary primer (5% by weight of a hardener, GE366S (trade name) was added to a primer, GE6001L (trade name), both available from Daito Jyushi K.K.) was coated with a brush thinly, and dried in an oven of 60° C. for 3 minutes.

Successively, an adhesive (4% by weight of a hardener, GE348 (trade name) was added to an adhesive, 98H (trade name), both available from Daito Jyushi K.K.) was coated with a brush thinly, and dried in an oven of 60° C. for 5 minutes.

Finally, the secondary crosslinked foamed product coated with the aforesaid adhesive and a sheet of a polyurethane artificial leather made by the following processes were laminated by contact bonding for 10 seconds and at a pressure of 20 kg/cm².

[Treatment of a Polyurethane Artificial Leather Sheet]

A surface of a polyurethane artificial leather sheet was washed with methylethylketone, and dried at a room temperature for 1 hour.

Then an auxiliary primer (5% by weight of a hardener, GE366S (trade name) was added to a primer, GE6001L (trade name), both available from Daito Jyushi K.K.) was coated with a brush thinly, and dried in an oven of 60° C. for 3 minutes.

Successively, an adhesive (4% by weight of a hardener, GE348 (trade name) was added to an adhesive, 98H (trade name), both available from Daito Jyushi K.K.) was coated with a brush thinly, and dried in an oven of 60° C. for 5 minutes.

[Peel Test]

An adhesive strength of the aforesaid laminated sheet by coat bonding after 24 hours was evaluated by the following manner:

Namely, a laminated sheet by coat bonding was cut by 1 cm width. After the end of the sheet was peeled off, peel strength was measured by pulling the end of the sheet with a rate of 200 mm/min and in a direction of 180 degrees.

Five samples were evaluated, and the average value of an adhesive strength is set forth in Table 1. The state of the peeling was observed with the naked eyes at that time.

(8) Moldability

Figure 2:
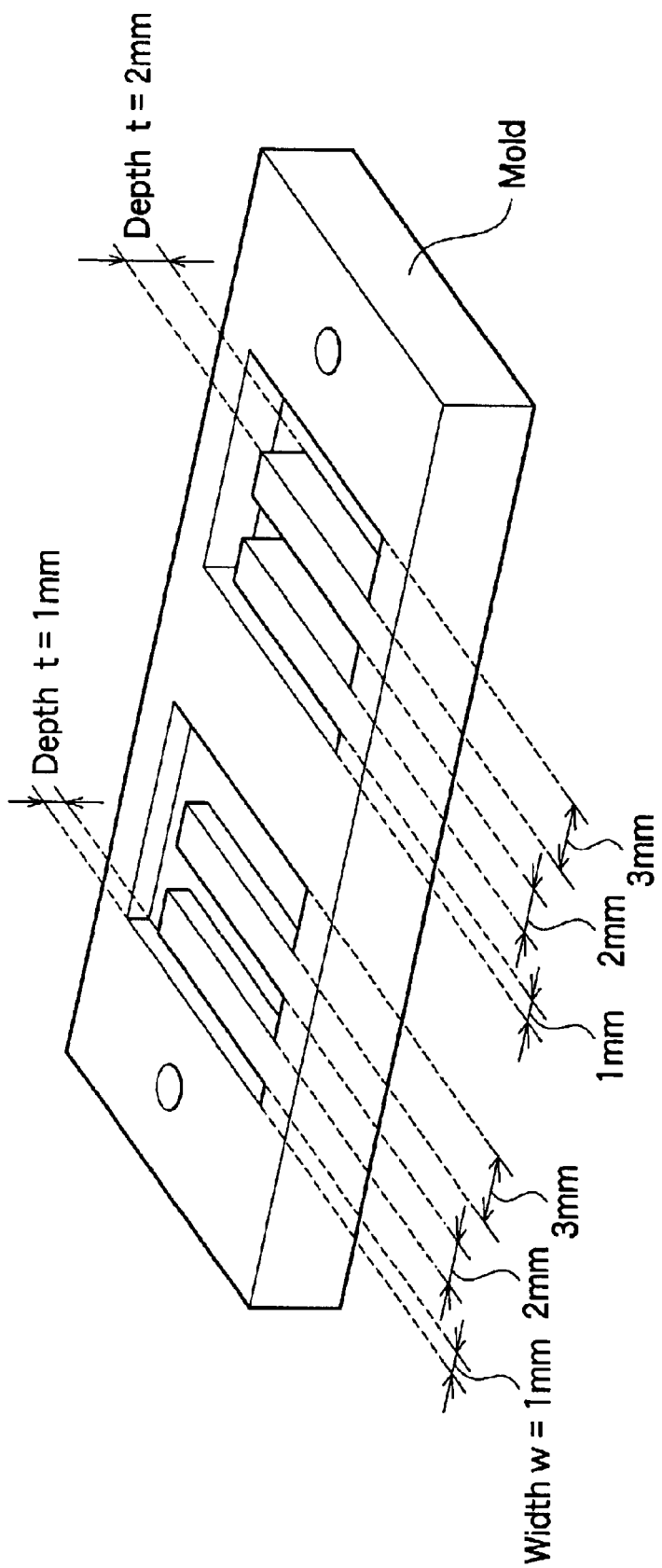
FIG. 2 is a schematic perspective view showing a secondary compression mold having an engraved side used in Example 1 and Comparative Example 1 in order to evaluate the moldability of the foamed product.

On the side of a secondary compression mold, a pattern as shown in FIG. 2 was engraved and the moldability was evaluated by using thereof. For example, the result of the evaluation was describes as t2-w2, if the moldability was good at the portion of 2 mm in depth and 2 mm in width.

Preparation Example 1

Preparation of catalyst Solution 18.4 Milligrams of triphenylcarbenium (tetrakispentafluorophenyl)borate were weighed out, and thereto was added 5 ml of toluene to dissolve it, whereby a toluene solution having a concentration of 0.004 mmol/ml was prepared. Separately, 1.8 mg of [dimethyl(t-butylamide) (tetramethyl-$\eta^5$-cyclopentadienyl)silane]titanium dichloride was weighed out, and thereto was added 5 ml of toluene to dissolve it, whereby a toluene solution having a concentration of 0.001 mmol/ml was prepared.

Then, 0.38 ml of the toluene solution of triphenylcarbenium(tetrakispentafluorophenyl)borate was weighed out, and 0.38 ml of the toluene solution of [dimethyl(t-butylamide)(tetramethyl-$\eta^5$-cyclopentadienyl) silane]titanium dichloride was weighed out, followed by adding 4.24 ml of toluene for diluting, to prepare 5 ml of a toluene solution having a triphenylcarbenium (tetrakispentafluorophenyl)borate concentration of 0.002 mmol/l in terms of B and a [dimethyl-(t-butylamide) (tetramethyl-$\eta^5$-cyclopentadienyl)silane]titanium dichloride concentration of 0.0005 mmol/l in terms of Ti. This toluene solution was used as a catalyst solution for polymerization.

Preparation of Ethylene/1-butene Copolymer (A-1)

To a 1.5-liter SUS autoclave equipped with a stirring blade, said autoclave having been thoroughly purged with nitrogen, 750 ml of heptane was fed at 23° C. With rotating the stirring blade and ice cooling, to the autoclave were fed 8 g of 1-butene and 250 ml of hydrogen.

Then, the autoclave was heated up to 100° C. and pressurized with ethylene so that the total pressure became 6 kg/cm². When the internal pressure of the autoclave became 6 kg/cm², 1.0 ml of a hexane solution of triisobutylaluminum (TIBA) having a concentration of 1.0 mmol/ml was forced into the autoclave with nitrogen. Subsequently, 5 ml of the catalyst solution was forced into the autoclave with nitrogen to initiate polymerization of ethylene and 1-butene. For the 5 ensuing minutes, temperature control and direct ethylene feeding were made so that the internal temperature of the autoclave became 100° C. and the pressure became 6 kg/cm². After 5 minutes from initiation of the polymerization, 5 ml of methanol was introduced into the autoclave by means of a pump to terminate the polymerization, followed by pressure release of the autoclave to atmospheric pressure. Into the reaction solution obtained, 3 liters of methanol was poured with stirring. The resulting polymer containing a solvent was dried at 130° C. for 13 hours at 600 Torr to obtain 10 g of an ethylene/1-butene copolymer (A-1).

The ethylene/1-butene copolymer (A-1) thus obtained had an ethylene content of 91% by mol, a 1-butene content of 9% by mol, a density (ASTM D 1505) of 0.893 g/cm³, a melt flow rate (ASTM D 1238, 190° C., load of 2.16 kg) of 3.8 g/10 min, a melt flow rate (ASTM D 1238, 190° C., load of 10 kg) of 31 g/10 min, a molecular weight distribution (Mw/Mn), as measured by GPC, of 2.0, and MFR$_{10}$/ MFR$_{2.16}$ of 8.2. The Shore A hardness (ASTM D 2240) of the ethylene/1-butene copolymer (A-1) was 92, and the temperature of a melting point peak in an endothermic curve of the copolymer (A-1) measured by DSC was 82° C. In the endothermic curve, any other peak was not observed, and therefore the position of the main melting peak was 82° C.

The molded product of the ethylene/1-butene copolymer (A-1) used in the measurement of a Shore A hardness was prepared in the following manner.

The ethylene/1-butene copolymer (A-1) was charged in a mold having a size of 200 mm×200 mm×2 mm (thickness), then hot pressed at a press temperature of 200° C. and a press pressure of 160 kg/cm$^2$ for 10 minutes and cooled at 20° C. for 5 minutes, to obtain a molded product.

Preparation Example 2

Preparation of Ethylene/1-butene Copolymer (A-2)

12 Grams of an ethylene/1-butene copolymer (A-2) were obtained in the same manner as in Preparation Example 1, except that the amount of 1-butene was changed to 6 g and the amount of hydrogen was changed to 150 ml.

The ethylene/1-butene copolymer (A-2) thus obtained had an ethylene content of 94% by mol, a 1-butene content of 6% by mol, a density (ASTM D 1505) of 0.905 g/cm$^3$, a melt flow rate (ASTM D 1238, 190° C., load of 2.16 kg) of 1.2 g/10 min, a melt flow rate (ASTM D 1238, 190° C., load of 10 kg) of 11.5 g/10 min, a molecular weight distribution (Mw/Mn), as measured by GPC, of 2.0, and MFR$_{10}$/MFR$_{2.16}$ of 9.6. The Shore D hardness (ASTM D 2240) of the ethylene/1-butene copolymer (A-2) was 43, and the temperature of a melting point peak in an endothermic curve of the copolymer (A-2) measured by DSC was 94° C. In the endothermic curve, any other peak was not observed, and therefore the position of the main melting peak was 94° C.

The molded product of the ethylene/1-butene copolymer (A-2) used in the measurement of a Shore D hardness was prepared in the same manner as in Preparation Example 1.

Preparation Example 3

Preparation of Ethylene/1-butene Copolymer (A-3)

10 Grams of an ethylene/1-butene copolymer (A-3) were obtained in the same manner as in Preparation Example 1, except that the amount of 1-butene was changed to 10 g and the amount of hydrogen was changed to 100 ml.

The ethylene/1-butene copolymer (A-3) thus obtained had an ethylene content of 89% by mol, a 1-butene content of 11% by mol, a density (ASTM D 1505) of 0.885 g/cm$^3$, a melt flow rate (ASTM D 1238, 190° C., load of 2.16 kg) of 0.5 g/10 min, a melt flow rate (ASTM D 1238, 190° C., load of 10 kg) of 5.0 g/10 min, a molecular weight distribution (Mw/Mn), as measured by GPC, of 2.1, and MFR$_{10}$/MFR$_{2.16}$ of 10. The Shore A hardness (ASTM D 2240) of the ethylene/1-butene copolymer (A-3) was 87, and the temperature of a melting point peak in an endothermic curve of the copolymer (A-3) measured by DSC was 66° C. In the endothermic curve, any other peak was not observed, and therefore the position of the main melting peak was 66° C.

The molded product of the ethylene/1-butene copolymer (A-3) used in the measurement of a Shore A hardness was prepared in the same manner as in Preparation Example 1.

Preparation Example 4

Preparation of Catalyst

In 154 liters of toluene, 10 kg of silica having been dried at 250° C. for 10 hours was suspended, and the suspension was cooled to 0° C. Thereafter, to the suspension was dropwise added 57.5 liters of a toluene solution of methylaluminoxane (Al concentration: 1.33 mol/l) over a period of 1 hour. During the addition, the temperature of the system was maintained at 0° C. The reaction of silica with methylaluminoxane was continued at 0° C. for 30 minutes. Then, the system was heated up to 95° C. over a period of 1.5 hours, and at that temperature, the reaction was conducted for 20 hours. Thereafter, the temperature was lowered to 60° C., and the supernatant liquid was removed by decantation. The solid component thus obtained was washed twice with toluene and then resuspended in 100 liters of toluene. To the system, 16.8 liters of a toluene solution of bis(1-methyl-3-n-butylcyclopentadienyl)zirconium dichloride (Zr concentration: 27.0 mmol/l) was dropwise added at 80° C. over a period of 30 minutes, and the reaction was further conducted at 80° C. for 2 hours. Then, the supernatant liquid was removed, and the residue was washed twice with hexane to obtain a solid catalyst containing 3.5 mg of zirconium based on 1 g of the catalyst.

Preparation of Prepolymerized Catalyst

To 87 liters of hexane containing 2.5 mol of triisobutylaluminum, 870 g of the above solid catalyst and 260 g of 1-hexene were added, and prepolymerization of ethylene was carried out at 35° C. for 5 hours to obtain a prepolymerized catalyst containing 10 g of polyethylene produced by prepolymerization based on 1 g of the solid catalyst.

Copolymerization

In a continuous fluidized bed gas phase polymerization apparatus, copolymerization of ethylene and 1-hexene was carried out at the total pressure of 18 kg/cm$^2$-G and a polymerization temperature of 75° C. To the apparatus were continuously fed the prepolymerized catalyst at a rate of 0.15 mmol/hr in terms of zirconium atom and triisobutylaluminum at a rate of 10 mmol/hr. During the polymerization, ethylene, 1-hexene, hydrogen and nitrogen were continuously fed in order to maintain the gas composition constant (gas composition: 1-hexene/ethylene=0.034, hydrogen/ethylene=$1.7 \times 10^{-4}$, ethylene concentration=20%).

The yield of the ethylene/1-hexene copolymer (A-4) obtained as above was 5.8 kg/hr.

The ethylene/1-hexene copolymer (A-4) had an ethylene content of 94% by mol, a 1-hexene content of 6% by mol, a density (ASTM D 1505) of 0.908 g/cm$^3$, a melt flow rate (ASTM D 1238, 190° C., load of 2.16 kg) of 0.8 g/10 min, a melt flow rate (ASTM D 1238, 190° C., load of 10 kg) of 4.4 g/10 min, a molecular weight distribution (Mw/Mn), as measured by GPC, of 2.1, and MFR$_{10}$/MFR$_{2.16}$ of 5.5. The Shore D hardness (ASTM D 2240) of the ethylene/1-hexene copolymer (A-4) was 46, and the temperatures of melting point peaks in an endothermic curve of the copolymer (A-4) measured by DSC were 85° C., 113° C. and 120° C. Of these, the temperature of the maximum peak was 12020 C., and therefore the position of the main melting point peak was 120° C.

The molded product of the ethylene/1-hexene copolymer (A-4) used in the measurement of a Shore D hardness was prepared in the same manner as in Preparation Example 1.

Example 1

A mixture consisting of 50 parts by weight of the ethylene/1-butene copolymer (A-1) obtained in Preparation Example 1, 50 parts by weight of the ethylene/1-butene copolymer (A-2) obtained in Preparation Example 2, 3.0 parts by weight of zinc oxide, 1.0 part by weight of stearic acid, 4.0 parts by weight of titanium white, 0.6 part by weight of dicumyl peroxide (DCP), 0.15 part by weight (in terms of TAIC content) of triallyl isocyanurate (TAIC, trade name: M-60 (TAIC content: 60%), available from Nippon Kasei K.K.) and 7.0 parts by weight of azodicarbonamide (trade name: CELLCOM-JTR, available from Kum Yang Chemical Co., Ltd. (Korea)) was kneaded by a laboplastomill (manufactured by Toyo Seiki Seisakusho, 100MR2 type) at a preset temperature of 110° C. for 5 minutes and then molded into a sheet.

In FIG. 1, change of torque with kneading time is shown. After 60-second lapse from the start of kneading, as shown in FIG. 1, the torque of Example 1 was always smaller than the torque of the later-described Comparative Example 1, and it can be seen that the kneadablity of Example 1 was superior to that of Comparative Example 1.

Further, the maximum temperature of the composition in the kneading process was measured, and after the kneading, the state of the composition was observed with the naked eye to evaluate dispersibility. The results are set forth in Table 1.

Then, the sheet obtained above was placed in a press mold and pressed with heating under the conditions of 150 kg/cm², 155° C. and 30 minutes to obtain a primary crosslinked foamed product. The press mold had a size of a thickness of 15 mm, a length of 200 mm and a width of 150 mm.

The thus obtained primary crosslinked foamed product was measured on the specific gravity, compression set and tear strength in accordance with the aforesaid methods. And also the feel of softness was evaluated in accordance with the aforesaid method.

The results are set forth in Table 1.

After cutting the skin, the primary crosslinked foamed product was pressed with heating under the conditions of 150 kg/cm², 155° C., 10 minutes and a compression ratio of 1.5 and then immediately cooled at 20° C. for 10 min to obtain a secondary crosslinked foamed product. The secondary crosslinked foamed product had a size of a thickness of 15 mm, a length of 250 mm and a width of 160 mm.

The secondary crosslinked foamed product was measured or evaluated on the specific gravity, Asker C hardness, tensile strength, tear strength, compression set, impact resilience and moldability in accordance with the aforesaid methods.

An adhesive strength of the laminate comprising a foamed product obtained and a polyurethane artificial leather sheet was measured by the aforesaid method as well as the state of the peeling was observed with the naked eyes at that time.

The results are set forth in Table 1.

Example 2

A primary crosslinked foamed product and then a secondary crosslinked foamed product were prepared with the same methods as described in Example 1, except 0.8 part by weight of dicumyl peroxide (DCP) was added instead of 0.6 part by weight of DCP.

Successively, the primary crosslinked foamed product obtained was measured on the specific gravity, compression set and tear strength in accordance with the aforesaid methods, and also the feel of softness was evaluated in accordance with the aforesaid method.

The results are set forth in Table 1.

Also, the secondary crosslinked foamed product obtained was measured or evaluated on the specific gravity, Asker C hardness, tensile strength, tear strength, compression set, impact resilience and moldability in accordance with the aforesaid methods.

An adhesive strength of the laminate comprising a foamed product obtained and a polyurethane artificial leather sheet was measured by the aforesaid method as well as the state of the peeling was observed with the naked eyes at that time.

The results are set forth in Table 1.

Example 3

A primary crosslinked foamed product and then a secondary crosslinked foamed product were prepared with the same methods as described in Example 1, except 50 parts by weight of the ethylene/1-butene copolymer (A-3) obtained in Preparation Example 3 was used instead 50 parts by weight of the ethylene/1-butene copolymer (A-1).

Successively, the primary crosslinked foamed product obtained was measured on the specific gravity, compression set and tear strength in accordance with the aforesaid methods, and also the feel of softness was evaluated in accordance with the aforesaid method.

The results are set forth in Table 1.

Also, the secondary crosslinked foamed product obtained was measured or evaluated on the specific gravity, Asker C hardness, tensile strength, tear strength, compression set, impact resilience and moldability in accordance with the aforesaid methods.

An adhesive strength of the laminate comprising a foamed product obtained and a polyurethane artificial leather sheet was measured by the aforesaid method as well as the state of the peeling was observed with the naked eyes at that time.

The results are set forth in Table 1.

Example 4

A primary crosslinked foamed product and then a secondary crosslinked foamed product were prepared with the same methods as described in Example 1, except 50 parts by weight of the ethylene/1-octene copolymer (A-5) and 50 parts by weight of the ethylene/1-octene copolymer (A-6) both described below were used instead 50 parts by weight of the ethylene/1-butene copolymer (A-1) and 50 parts by weight of the ethylene/1-butene copolymer (A-2).

Successively, the primary crosslinked foamed product obtained was measured on the specific gravity, compression set and tear strength in accordance with the aforesaid methods, and also the feel of softness was evaluated in accordance with the aforesaid method.

The results are set forth in Table 1.

Also, the secondary crosslinked foamed product obtained was measured or evaluated on the specific gravity, Asker C hardness, tensile strength, tear strength, compression set, impact resilience and moldability in accordance with the aforesaid methods.

An adhesive strength of the laminate comprising a foamed product obtained and a polyurethane artificial leather sheet was measured by the aforesaid method as well as the state of the peeling was observed with the naked eyes at that time.

The results are set forth in Table 1.

The above ethylene/1-octene copolymer (A-5) was produced by DuPont Dow Elastomers L. L. C. and commercially available as a trade name of "Engage", and had an ethylene content of 90% by mol, a 1-octene content of 10% by mol, a density (ASTM D 1505) of 0.886 g/cm³, a melt flow rate (ASTM D 1238, 190° C., load of 2.16 kg) of 2.67 g/10 min, a melt flow rate (ASTM D 1238, 190° C., load of 10 kg) of 21.9 g/10 min, a molecular weight distribution (Mw/Mn), as measured by GPC, of 2.1, and $MFR_{10}/MFR_{2.16}$ of 8.2. The Shore A hardness (ASTM D 2240) of the ethylene/1-octene copolymer (A-5) was 88, and the temperature of a melting point peak in an endothermic curve of the copolymer (A-5) measured by DSC was 83° C. In the endothermic curve, any other peak was not observed, and therefore the position of the main melting peak was 83° C.

The molded product of the ethylene/1-octene copolymer (A-5) used in the measurement of a Shore A hardness was prepared in the same manner as in Preparation Example 1.

And the above ethylene/1-octene copolymer (A-6) was produced by Exxon-Mobil Chemical Co. and commercially available as a trade name of "Exact", and had an ethylene content of 94% by mol, a 1-octene content of 6% by mol, a density (ASTM D 1505) of 0.903 g/cm$^3$, a melt flow rate (ASTM D 1238, 190° C., load of 2.16 kg) of 1.1 g/10 min, a melt flow rate (ASTM D 1238, 190° C., load of 10 kg) of 8.7 g/10 min, a molecular weight distribution (Mw/Mn), as measured by GPC, of 2.1, and MFR$_{10}$/MFR$_{2.16}$ of 7.9. The Shore D hardness (ASTM D 2240) of the ethylene/1-octene copolymer (A-6) was 41, and the temperature of a melting point peak in an endothermic curve of the copolymer (A-6) measured by DSC was 98° C. In the endothermic curve, any other peak was not observed, and therefore the position of the main melting peak was 98° C.

The molded product of the ethylene/1-octene copolymer (A-6) used in the measurement of a Shore D hardness was prepared in the same manner as in Preparation Example 1.

Comparative Example 1

A primary crosslinked foamed product and then a secondary foamed product were prepared in the same manner as in Example 1, except that 50 parts by weight of the ethylene/1-hexene copolymer (A-4) obtained in Preparation Example 4 was used instead of 50 parts by weight of the ethylene/1-butene copolymer (A-2).

In FIG. 1, change of torque of the composition with kneading time is shown. Further, the maximum temperature of the composition in the kneading process was measured, and after the kneading, the state of the composition was observed with the naked eye to evaluate dispersibility.

The results are set forth in Table 1.

The primary crosslinked foamed product obtained was measured on the specific gravity, compression set and tear strength in accordance with the aforesaid methods, and also the feel of softness was evaluated in accordance with the aforesaid method.

The results are set forth in Table 1.

Successively, the secondary crosslinked foamed product was measured or evaluated on the specific gravity, Asker C hardness, tensile strength, tear strength, compression set, impact resilience and moldability in accordance with the aforesaid methods.

An adhesive strength of the laminate comprising a foamed product obtained and a polyurethane artificial leather sheet was measured by the aforesaid method as well as the state of the peeling was observed with the naked eyes at that time.

The results are set forth in Table 1.

Comparative Example 2

A primary crosslinked foamed product and then a secondary foamed product were prepared in the same manner as in Example 1, except that 50 parts by weight of the ethylene/1-hexene copolymer (A-4) and 50 parts by weight of the ethylene/1-octene copolymer (A-5) were used instead of 50 parts by weight of the ethylene/1-butene copolymer (A-1) and 50 parts by weight of the ethylene/1-butene copolymer (A-2).

Successively, the primary crosslinked foamed product obtained was measured on the specific gravity, compression set and tear strength in accordance with the aforesaid methods, and also the feel of softness was evaluated in accordance with the aforesaid method.

The results are set forth in Table 1.

Also, the secondary crosslinked foamed product was measured or evaluated on the specific gravity, Asker C hardness, tensile strength, tear strength, compression set, impact resilience and moldability in accordance with the aforesaid methods.

An adhesive strength of the laminate comprising a foamed product obtained and a polyurethane artificial leather sheet was measured by the aforesaid method as well as the state of the peeling was observed with the naked eyes at that time.

The results are set forth in Table 1.

TABLE 1

|  | Ex. 1 | Ex. 2 |
|---|---|---|
| Kneadability of composition |  |  |
| Maximum temperature of composition (° C.) | 118 | 119 |
| State of composition after kneading | soft and well dispersed | soft and well dispersed |
| Properties of primary crosslinked foamed product |  |  |
| Specific gravity (Skin$_{off}$) | 0.090 | 0.101 |
| Compression set (%) | 62 | 60 |
| Tear strength (N/cm) | 19 | 21 |
| Feel of softness | 5 | 5 |
| Properties of secondary crosslinked foamed product |  |  |
| Compression ratio | 1.5 | 1.5 |
| Specific gravity (Skin$_{on}$) | 0.138 | 0.162 |
| Asker C hardness | 53 | 56 |
| Tensile strength (MPa) | 2.6 | 2.9 |
| Compression set (%) | 41 | 38 |
| Tear strength (N/cm) | 30 | 31 |
| Impact resilience (%) | 59 | 62 |
| Moldability | t2–w2 | t2–w3 |
| Laminate |  |  |
| Adhesive strength after 24 hrs (N/cm) | 36 | 33 |
| State of peeling | material of foamed product was destroyed | material of foamed product was destroyed |
|  | Ex. 3 | Ex. 4 |
| Kneadability of composition |  |  |
| Maximum temperature of composition (° C.) | 130 | 121 |
| State of composition after kneading | soft and well dispersed | soft and well dispersed |
| Properties of primary crosslinked foamed product |  |  |
| Specific gravity (Skin$_{off}$) | 0.098 | 0.092 |
| Compression set (%) | 58 | 60 |
| Tear strength (N/cm) | 20 | 21 |
| Feel of softness | 5 | 5 |
| Properties of secondary crosslinked foamed product |  |  |
| Compression ratio | 1.5 | 1.5 |
| Specific gravity (Skin$_{on}$) | 0.153 | 0.143 |
| Asker C hardness | 53 | 52 |
| Tensile strength (MPa) | 3.0 | 2.7 |
| Compression set (%) | 36 | 40 |
| Tear strength (N/cm) | 31 | 31 |
| Impact resilience (%) | 63 | 61 |
| Moldability | t2–w2 | t2–w2 |
| Laminate |  |  |
| Adhesive strength after 24 hrs (N/cm) | 38 | 18 |
| State of peeling | material of foamed product was destroyed | about 50% of interface was peeled off(*) |
|  | Comp. Ex. 1 | Comp. Ex. 2 |

TABLE 1-continued

| | | |
|---|---|---|
| Kneadability of composition | | |
| Maximum temperature of composition (° C.) | 132 | 133 |
| State of composition after kneading | uneven and slightly badly dispersed | uneven and slightly badly dispersed |
| Properties of primary crosslinked foamed product | | |
| Specific gravity (Skin$_{off}$) | 0.093 | 0.095 |
| Compression set (%) | 65 | 62 |
| Tear strength (N/cm) | 19 | 20 |
| Feel of softness | 4 | 4 |
| Properties of secondary crosslinked foamed product | | |
| Compression ratio | 1.5 | 1.5 |
| Specific gravity (Skin$_{on}$) | 0.144 | 0.144 |
| Asker C hardness | 54 | 53 |
| Tensile strength (MPa) | 2.7 | 2.7 |
| Compression set (%) | 42 | 40 |
| Tear strength (N/cm) | 30 | 30 |
| Impact resilience (%) | 58 | 59 |
| Moldability | t1–w2 | t1–w2 |
| Laminate | | |
| Adhesive strength after 24 hrs (N/cm) | 28 | 22 |
| State of peeling | interface was partially peeled off(*) | about 50% of interface was peeled off(*) |

(*) The interface of laminate comprising a layer of the formed product and a layer of a polyurethane artificial leather sheet was peeled off.

What is claimed is:

1. A composition comprising an ethylene/α-olefin copolymer (A) and a blowing agent (B), wherein the ethylene/α-olefin copolymer (A) comprises:

5 to 95 parts by weight of an ethylene/α-olefin copolymer (A1) having a density of not less than 0.880 g/cm$^3$ and less than 0.900 g/cm$^3$ and a melt flow rate determined according to ASTM D 1238 at a temperature of 190° C., and a load of 2.16 kg of 0.1 to 50 g/10 min, and 5 to 95 parts by weight of an ethylene/α-olefin copolymer (A2) having a density of 0.900 to 0.930 g/cm$^3$, a melt flow rate determined according to ASTM D 1238 at a temperature of 190° C., and a load of 2.16 kg of 0.1 to 50 g/10 mm, a main melting point peak at a position of not higher than 110° C. and a surface hardness of 30 to 70 in terms of a Shore D hardness determined according to ASTM D 2240, the total of said components (A1) and (A2) being 100 parts by weight.

2. The composition as claimed in claim 1, wherein both the ethylene/α-olefin copolymers (A1) and (A2) are ethylene/1-butene copolymers.

3. The composition as claimed in claim 1, wherein at least one of the ethylene/α-olefin copolymers (A1) and (A2) has the following properties:

the ratio (MFR$_{10}$/MFR$_{2.16}$) of the melt flow rate (MFR$_{10}$), as measured under the conditions of a temperature of 190° C. and a load of 10 kg in accordance with ASTM D 1238, to the melt flow rate (MFR$_{2.16}$), as measured under the conditions of a temperature of 190° C. and a load of 2.16 kg in accordance with ASTM D 1238, satisfies the following relation:

MFR$_{10}$/MFR$_{2.16}$ ≧ 5.63, and the molecular weight distribution (Mw/Mn) and the above-mentioned melt flow rate ratio satisfy the following relation:

Mw/Mn ≦ (MFR$_{10}$/MFR$_{2.16}$) − 4.63.

4. The composition as claimed in claim 3, wherein at least one of the ethylene/α-olefin copolymers (A1) and (A2) has the following properties:

the ratio (MFR$_{10}$/MFR$_{2.16}$) of the melt flow rate (MFR$_{10}$), as measured under the conditions of a temperature of 190° C. and a load of 10 kg in accordance with ASTM D 1238, to the melt flow rate (MFR$_{2.16}$), as measured under the conditions of a temperature of 190° C. and a load of 2.16 kg in accordance with ASTM D 1238, satisfies the following relation:

MFR$_{10}$/MFR$_{2.16}$ ≧ 5.63, and the molecular weight distribution (Mw/Mn), the melt flow rate and the above-mentioned melt flow rate ratio satisfy the following relation:

Mw/Mn + 4.63 ≦ MFR$_{10}$/MFR$_{2.16}$ ≦ 14 − 2.9 Log(MER$_{2.16}$).

5. The composition as claimed in claim 1, wherein the ethylene/α-olefin copolymer (A2) is a copolymer obtained by solution polymerization.

6. The composition as claimed in claim 1, wherein the ethylene/α-olefin copolymer (A2) is an ethylene/1-butene copolymer.

7. The composition as claimed in claim 1, wherein the ethylene/α-olefin copolymer (A) has a density of 0.880 to 0.920 g/cm$^3$ and a melt flow rate determined according to ASTM D 1238, at a temperature of 190° C., and a load of 2.16 kg of 0.1 to 10 g/10 mm.

8. The composition as claimed in claim 1, wherein the blowing agent (B) is selected from an organic thermal decomposition type blowing agent, an inorganic thermal decomposition type blowing agent, an organic physical blowing agent and an inorganic physical blowing agent.

9. A foamed product obtained by heat treatment of the composition of claim 1.

10. A foamed product as claimed in claim 9, Which is obtained by secondary compression of said foamed product.

11. The foamed product as claimed in claim which has a specific gravity determined according to JIS K 7222 of 0.05 to 0.25 and a surface hardness according to Asker C hardness of 20 to 80.

12. A laminate having:
   a layer comprising the foamed product of claim 9, and
   a layer comprising at least one material selected from the group consisting of a polyolefin, a polyurethane, a rubber, a leather and an artificial leather.

13. A process for producing the laminate as claimed in claim 12 comprising:
   foaming the composition as claimed in claim 1 to obtain a foamed product, and
   laminating said foamed product with at least one material selected from the group consisting of a polyolefin, a polyurethane, a rubber, a leather and an artificial leather.

14. Footwear comprising the foamed product of claim 9 or the laminate of claim 12.

15. A footwear part comprising the foamed product of claim 9 or the laminate of claim 12.

16. The footwear part as claimed in claim 15, which is a midsole, an innersole or a sole.

* * * * *